(12) United States Patent
Garcia Martin et al.

(10) Patent No.: US 7,347,026 B1
(45) Date of Patent: Mar. 25, 2008

(54) DOOR MODULE

(75) Inventors: Jose Francisco Garcia Martin, Burgos (ES); Jose Ignacio Gonzalez Saiz, Burgos (ES); Alberto Manso Moneo, Burgos (ES); Ricardo Manzanas Rodriguez, Torquemada (ES); Cesar Marcos Gonzalez, Burgos (ES); Francisco Javier Martinez Moral, Burgos (ES)

(73) Assignee: Grupo Antolin-Ingeniera S.A., Burgos (ES)

( * ) Notice: Subject to any disclaimer, the term of this patent is extended or adjusted under 35 U.S.C. 154(b) by 0 days.

(21) Appl. No.: 09/581,946

(22) PCT Filed: Oct. 20, 1999

(86) PCT No.: PCT/ES99/00335

§ 371 (c)(1),
(2), (4) Date: Nov. 8, 2000

(87) PCT Pub. No.: WO00/23294

PCT Pub. Date: Apr. 27, 2000

(30) Foreign Application Priority Data

| Oct. 20, 1998 | (ES) | 9802184 |
| Jan. 29, 1999 | (ES) | 9900184 |
| Aug. 6, 1999 | (ES) | 9901808 |

(51) Int. Cl.
*B60J 5/04* (2006.01)

(52) U.S. Cl. .................. 49/502; 49/352; 296/146.7

(58) Field of Classification Search ............ 49/502, 49/503, 352, 348, 349; 296/146.5, 146.6, 296/146.7
See application file for complete search history.

(56) References Cited

U.S. PATENT DOCUMENTS

| 3,778,101 | A | * | 12/1973 | Tsuda ....................... 296/154 |
| 4,445,721 | A | | 5/1984 | Yasuyuki et al. |
| 4,648,208 | A | | 3/1987 | Haimo et al. |
| 4,662,115 | A | * | 5/1987 | Ohya et al. ................. 49/502 |
| 4,785,585 | A | * | 11/1988 | Grier et al. ................. 49/502 |
| 4,845,894 | A | * | 7/1989 | Herringshaw et al. ........ 49/502 |
| 4,848,829 | A | * | 7/1989 | Kidd ......................... 296/152 |
| 4,937,977 | A | * | 7/1990 | Gergoe et al. ............... 49/352 |
| 4,957,803 | A | | 9/1990 | Foley |
| 5,050,350 | A | * | 9/1991 | Bertolini et al. ............. 49/502 |
| 5,067,281 | A | * | 11/1991 | Dupuy ...................... 49/352 |
| 5,095,659 | A | * | 3/1992 | Benoit et al. ................ 49/502 |
| 5,904,002 | A | * | 5/1999 | Emerling et al. ............ 49/502 |
| 5,927,020 | A | * | 7/1999 | Kobrehel .................... 49/502 |
| 5,964,063 | A | * | 10/1999 | Hisano et al. ............... 49/502 |
| 6,119,407 | A | * | 9/2000 | Staser et al. ................. 49/502 |

(Continued)

FOREIGN PATENT DOCUMENTS

EP 0 712 746 5/1996

(Continued)

Primary Examiner—Jerry Redman
(74) Attorney, Agent, or Firm—Browdy and Neimark, PLLC (57) ABSTRACT

A door module, with a trim (9) on which practically all the component items are mounted or assembled, mechanical subassemblies of the lock and the window winder, wiring, etc. with a relative sliding movement between the mechanical subassemblies and the trim, facilitating assembly in the door. The trim includes openings for access to the fixing points for the different items in the door inner liner, as well as a system of waterproofing against moisture.

6 Claims, 10 Drawing Sheets

U.S. PATENT DOCUMENTS

| | | | |
|---|---|---|---|
| 6,134,840 A * | 10/2000 | Pleiss | 49/502 |
| 6,192,632 B1 * | 2/2001 | Medebach et al. | 49/502 |
| 6,438,899 B1 * | 8/2002 | Feder et al. | 49/502 |
| 6,546,674 B1 * | 4/2003 | Emerling et al. | 49/502 |

FOREIGN PATENT DOCUMENTS

| | | |
|---|---|---|
| FR | 2 776 965 | 10/1999 |
| WO | WO 97 45283 | 12/1997 |

* cited by examiner

DOOR MODULE

CROSS REFERENCE TO RELATED APPLICATION

The present application is the national stage under 35 U.S.C. 371 of PCT/ES99/00335, filed 20 Oct. 1999.

This invention relates to a door module for automobile vehicles that, with its particular characteristics, creates appreciable advantages in relation to traditional techniques.

As far as is known, there have been several attempts aimed at constituting door module units for incorporation into the door inner liners of vehicles. In general, these attempts have been limited as regards their concept, which has meant that they have not been practical in their incorporation into these techniques, due to the fact that, among other shortcomings, they required important structural alternations to be carried out during assembly.

One object of this invention is to provide a door module that allows direct assembly onto it of practically all the component items, as well as other items typical of the surroundings, such as catadioptric aerators, compartments or side airbags, for example.

Another object of the invention is to provide a door module which is capable of providing relative movement between the mechanical subsystems, locks and window winders, and the door trim subsystem, with which it makes the process of assembling the unit on the door easier.

Another object of the invention is to provide a door module that rationalises the assembly of the unit and proves more economical that those systems traditionally used up to now.

Another object of the invention is to provide a waterproofing unit that ensures an increase of the waterproof capacity of the trim items.

Another object of the invention is to provide a waterproofing unit that acts as a lower support for the trim or for the door module, thus making the assembly of the unit easier.

Another object of the invention is to provide a waterproofing unit that effectively prevents water from reaching the weld lines.

A final object of the invention is to provide a waterproofing unit which is robust and effective against tolerances, both in manufacturing and in assembly.

In order to achieve these objectives, the invention proposes the production of a waterproofing unit on a group or association of a door panel and a door inner liner, on which the door trim is later situated, and with this unit being composed of a deflector that protrudes from the door panel itself and is a constituent part of this panel, and below its position and a certain distance from it, two support appendages, also constituent parts of the said panel, and with these two appendages situated a short distance from each other.

To put these objectives into practice, the invention includes a base body or trim, on which the complete subassembly of the window winder, the lock subassembly with the operating cable, the internal opening control, the electric wiring, the waterproofing devices for the system, the internal door pull handle, the loudspeaker, the electrical controls for the window winder and the lock, and the external opening control subassembly are mounted.

As mentioned previously, and apart from these components, other auxiliary items, which are typical of this area, are incorporated into the trim, for instance aerators, compartments, etc.

One outstanding characteristic of the module in the invention is that it enables relative movement between the mechanical systems of the lock and the window winder in relation to the subsystem of the door trim itself, so that the assembly of these items onto the door trim is carried out with a capacity for relative displacement, which allows the prior assembly of the module onto the door inner liner, as well as the completely normal final fixing of the said mechanical subsystems.

The motor for the window winder subsystems can be pressure fitted, either on a metallic or similar support with fixing attachments between one of the rails of the window winder and the door itself, in accordance with the traditional way of operating, or directly situated onto the door trim without metallic or plastic supports of any type.

In this latter case, the door trim itself supports the motor during the handling and transport stages prior to the final assembly into the vehicle, so that it is fixed directly to the door structure or frame by means of bolts, rivets or similar.

The lock subassembly is placed onto the door trim, and there is always a system in the latter that enables movement of this subassembly. This allows the positioning of the lock onto the door inner liner in such a way that the operation of bolting, riveting or similar of this subassembly to the said door inner liner can be carried out.

This lock subassembly is connected, by means of a mechanical system using wires, rods or similar, to the interior door opening control in such a way that the lock-interior opening control unit is totally positioned on the door module.

On the other hand, and in those cases where the geometry of the door so permits, the connection of the lock with the exterior opening control will be carried out in such a way that the lock-exterior and interior opening wires or rods subassembly is positioned on the door module.

The module will have at least one removable or detachable part, through which access can be obtained to the lock, the window winder motor and the upper window winder system. This removable part is fixed to the rest of the trim by means of clips or similar items.

The invention also proposes that this removable part can be secured to the rest of the trim by means of a hinged area that facilitates the opening and later closing of the part.

One variant of the module includes a window winder with its kinematic chain and drive systems, the lock together with the interior handle and the corresponding drive wires, as well as an intermediate base of ribbed steel plates, which carries out the function of reinforcing and supporting the unit.

Moreover, it incorporates all the trim and the corresponding auxiliary items, side compartments, bosses, loudspeaker grille, loudspeaker, wiring and drive items for the electrical systems, as well as other devices that might be incorporated in the future.

The window winder supported by the module can be of any type, which is pointed out here for the consequent appropriate purposes.

The lock mounted on the ribbed steel plate is capable of being retracted during assembly, so that it avoids any problematic interference. Therefore, the lock can be made to slide back on the said steel plate in order to be located in its final position for assembly, once that the rest of the module has been assembled onto the door.

Basically, the trim will be made of impermeable waterproof material and will have a waterproof strip or band around the outer surface, so that it creates a closure with the door inner liner itself.

It will also have sealing gaskets at all the connections between the different components, in order to impede the passage of moisture and dust that might enter the interior of the passenger compartment through the door inner liner.

The module unit or assembly is fixed to the door in two stages, following, in the first instance, the guidelines laid down in WO-A-99/25587. In the first stage, the assembly is carried out with a vertical downward movement, which permits fast fixing systems to be used.

In the second stage, the supports for the rails are bolted to those for the steel plate and for the lock, taking into account that the connection between the rails and the trim is such that the latter also becomes secured by the same bolts as the rails.

In this case, the trim will also have at least one central boss, which is removable so that is allows access for the bolting together of the rails and the support, as well as for other operations, such as the correct final positioning of the lock, the connection of the exterior opening handle and the drive cable, the connection and adjustment of the window pane with window winder system and the assembly of the electrical connectors.

On the other hand, it is pointed out for the appropriate purposes that the assembly of the trim and the other items can be dismantled from the door with great ease, so that it permits later repair operations to be carried out.

The ribbed plate by way of a metallic reinforcement can take the form of a variant with an approximately "X" shape, which will also be provided with a prolongation in order to incorporate the lock unit in the same way as described previously.

In accordance with this variant, three functions can be fulfilled:

One of these is the support function, during transport, of the items that it is composed of.

A second function is as a support for the window winder system throughout the whole of the working life of the vehicle.

A third function is as a structural reinforcement for the door inner liner itself, which contributes to its rigidity by improving the performance against side impact of the whole door. This is very desirable, as the door inner liner will have been weakened by the fact of requiring the assembly of the module.

In accordance with this variant configuration, the reinforcing part is secured to the door inner liner by means of four bolt- or screw-fitted connections, which will correspond with the four ends of the "X" shape of the ribbed plate. The two upper connections will be supported on the upper part of the door and the two lower ones on the part close to the lower edge of the door inner liner.

The window winder system, in this case, will be fixed to the ribbed plate, spot-welded, riveted or bolted (screwed). This connection also fulfils the function of supporting the window winder system on the X-shaped support, not only during the transport and handling of the module until it is assembled on the door, but also during the working life of the vehicle.

Within this same line, it is also pointed out that the X-shaped plate will make it possible to obtain, in the production process by press forming, two edges along which the drive slides of the window winder would move. In this way, it would achieve the integration of the rails of a double rail window winder in one single multifunctional part.

Within the general context of the module that includes the reinforcing ribbed plate, it is pointed out that the window winder supported by the module can be either manually or electrically operated and use either single or double rail systems, with mechanical arms or "sirga", all of which can be used in any of their possible variants.

In order to implement the watertightness, also an objective of the present invention, it is proposed that a waterproof set should be made of the unit or association of a door panel and a door inner liner, onto which the door trim is later situated, with this set being composed of a deflector protruding from door panel itself and is a constituent part of this panel and below its position and a certain distance from it, two support appendages, also constituent parts of the said panel, and with these two appendages situated a short distance from each other.

The deflector acts as a support base for a sheet of foam or elastic material adhered, for example, to the lower side of this deflector, with the deflector-sheet unit becoming established in a continuous manner, supported on a projection in the interior of the door inner liner arranged on the door panel and in at least the lower area of the said door inner liner.

Below the above-mentioned projection, the door inner liner includes two drain holes at different levels arranged at regular intervals in the low area of the door inner liner, with these holes being contained in a flat area of the door inner liner and a certain distance from the free ends of the previously mentioned appendages that come from the door panel.

A continuous rubber or foam profile is arranged between the two appendages from the panel, housed and secured in the space between the said appendages and clamped in turn around one of them in order to make its position effective. The profile is provided with two protruding ends that are supported on the side of the door inner liner, just below the two levels at which the drain holes are made, thus achieving a duplicate solution with these two lines of waterproofing, in that each support surface therefore defines a line of waterproofing on which there are drain holes.

With this assembly, perfect watertightness is achieved, with the particularity that the internal deflector-sheet unit can act as the lower support for the door trim or door module, thus making assembly easier.

One variant of the unit in the invention consists of the possibility of replacing the waterproofing profile mentioned with a strip or band of adhesive or similar, situated between the free ends of the two appendages and the surface of the door inner liner.

If the door trim or door module to be situated requires the fitting of bolts or screws at any point of the waterproofing perimeter, a metallic rivet is provided, with which it is possible to ensure the tightening torque of the bolt or screw without deforming the plastic part.

Another detail of the waterproofing consists of providing the deflector with any approximately centred portion by way of a drain channel, directed downwards, with the surface of the deflector, on both sides of the channel, being inclined so that the said channel occupies the lowest position. In this way, it prevents any type of water condensation from becoming deposited in liquid form on the deflector and providing it with a possible outlet towards the door inner liner, through, for example, a hole made in the said door inner liner that sends the liquid towards the bottom of the door inner liner, where it is evacuated towards the area for damp where the conventional holes are made for water to run out.

On arranging the module in the door inner liner, it will incorporate this perimetric waterproofing system into the one described.

The waterproofing of the removable area can be carried out in different ways: by means of the use of surfaces provided with foam, placed over the rear part of the removable area, that prevent the entry of water into the interior of the passenger compartment; by means of rubber seals or similar, or by means of other similar systems.

As stated previously, the module becomes secured to the door by means of fixing appendages similar to those used by WO-A-99/25587, as well as by the upper window bead or weather-strip and the different bolts or screws of the several mechanical subsystems.

The door required for this modular system to be adopted will have a conventional structure with two large gaps or hollows to allow the insertion of the mechanical systems.

The unit in the invention will be observed in greater detail in the accompanying sheets of drawings, on which it is represented as follows:

FIG. 1 is an elevation of the door module in accordance with the invention, seen on the side of which the different units are arranged.

FIG. 2 represents the elevation of the module from the other side that accedes to the interior of the vehicle.

FIGS. 3 and 4 represent the possible movements of the lock, in which FIG. 3 shows the final position and FIG. 4 shows the initial or transport position.

FIGS. 5 and 6 are a solution for the sliding between the window winder subsystem and the trim itself.

FIG. 7 is a diagrammatic representation that shows the hollows or gaps and the auxiliary portion of the trim hinged to the base.

FIG. 8 is also a diagrammatic representation of the door inner liner in which the module of the invention will be fixed.

FIG. 9 represents the variant of the door module.

FIG. 10 shows the mechanical unit in FIG. 9

FIG. 12 represents the fixing points for the trim, in a rear view of the same.

FIG. 13 is a detail of the movements for the assembly of the fixing items for the trim onto the door.

FIG. 14 shows the boss and the trim, seen from the visible side of both.

FIG. 15 is a detail of the retractable lock system and its movement on the base plate.

FIG. 16 is a cross section elevation that shows the waterproofing unit in a preferred solution.

FIG. 17 represents the variant of the previous figure when the use of some type of bolt or screw is required.

FIG. 18 is the detail of the water drain channel of the deflector.

FIG. 19 is a side view corresponding to the cross section I-I in the previous figure.

FIG. 20 is a front view of a door with the trim incorporated, including the waterproofing unit.

FIG. 21 is a replacement variant of the waterproofing unit.

FIG. 22 shows the variant consisting of producing the ribbed reinforcing plate in an "X" shape.

FIG. 23 also represents the variant developed from the previous figure, with the slid edges for the drive slides.

In FIG. 1, other items such as those mentioned previously which are typical of this area, are not represented, all of which are also assembled on the trim.

FIG. 2, the side visible toward the passenger compartment of the vehicle, shows the interior door handle (18), the position of the loudspeaker (7), the motor (13) and the ends of the rails (17) of the window winder.

Both in this FIG. 2 and also in FIG. 1, we can also appreciate a removable or detachable portion (16) in order to allow access to the different items when the module, having been inserted into the door inner liner, is fixed to it permanently, a point that will be further explained later.

The relative movement between the lock (12) and the interior opening handle, in FIGS. 3 and 4, makes it possible to appreciate the prior assembly position, FIG. 4, in which the lock (12) is to be found on the base (2) mounted on the trim (9) and connected by a Bowden-type cable (11) to the said interior opening handle, whereas once that the prior presentation of the module (9) has been carried out on the door inner liner by insertion of the appendages (15) in the corresponding holes of the said door inner liner, the operation of the cable (11) enables the lock (12) to be extracted, FIG. 3, for its final fixing to the door inner liner.

As far as the window winder subsystem is concerned, it is also mounted in a sliding manner on the trim, FIGS. 5 and 6, with a solution being appreciated in this respect for this purpose, based on the combination of the lugs (21) fixed to the trim (9) and arranged parallel to each other.

Both lugs are each provided with wide hollows or recesses (22) in which the end of the L-shaped appendage coming from the rail is housed, so that once the rails, are they are mounted in the trim, are provided with some play capability, so that it enables the module with the window winder unit attached to be easily inserted into the gaps in the door inner liner for positioning prior to fixing.

From FIG. 7 we can deduce the variant relating to the provision of removable spaces in the module, according to which a hinged portion (23) of the trim (9) is established, which can be equipped with gaps or recesses (24) for access to other parts of the module, with these parts later receiving non-hinged removable elements or otherwise allow access to openings (25').

In accordance with FIG. 8, we can appreciate a typical solution for the door inner liner (26), in which the two large gaps or hollows (27, 28) allow sufficient space for the insertion of the rails of the window winder subsystem, and the side gaps or holes (29) for the handing of the module by means of the insertion of the appendages (15) into them.

In accordance with FIG. 9, we can appreciate the unit composed of the trim (9) and the base plate (30) mounted on it, as well as the gap or recess (16) for the boss to be assembled on the edge (34) of the said gap. The window winder can also be observed, mounted on the base plate (30), in this case a double rail system with it wiring, the lugs (31) for connection to the rail supports on the edge of the boss, the pins (A) for fastening the unit onto the door inner liner and the lock units in its prior or assembly position (12') and final position (12) once that it has been moved.

According to FIG. 10, we can see in greater detail the relationship between the base plate (30) and the window winder unit, as well as the two positions (12, 12') of the lock and the parts (32) for fixing the rails to the lugs (32) at the edge of the gap for the boss.

With regard to FIG. 12, we highlight the lower fasteners (36), on the trim (9), for the rails (17) of the window winder system and for the trim itself on the door inner liner, the three support parts (35) on the trim itself and the pins (A) for fastening the support or base part onto the trim.

The prior assembly of the trim unit (9), with the different components, onto the door inner liner, is as illustrated in FIG. 13. Like this, the trim (9) which is provided with some pins (A) and also has an upper portion (D), which is folded or bent down, is situated opposite the inner skin or face (36) of the door inner liner, which in turn is provided with the recess (B), until it is made to frontally approach the said skin or face.

The trim is raised until the upper portion (D) reaches the upper end (C) of the skin, so that the upper fitting (C, D) takes place, and also the insertion and corresponding lodging of the pins (A) in the recess (B) in the skin.

Figure 11:
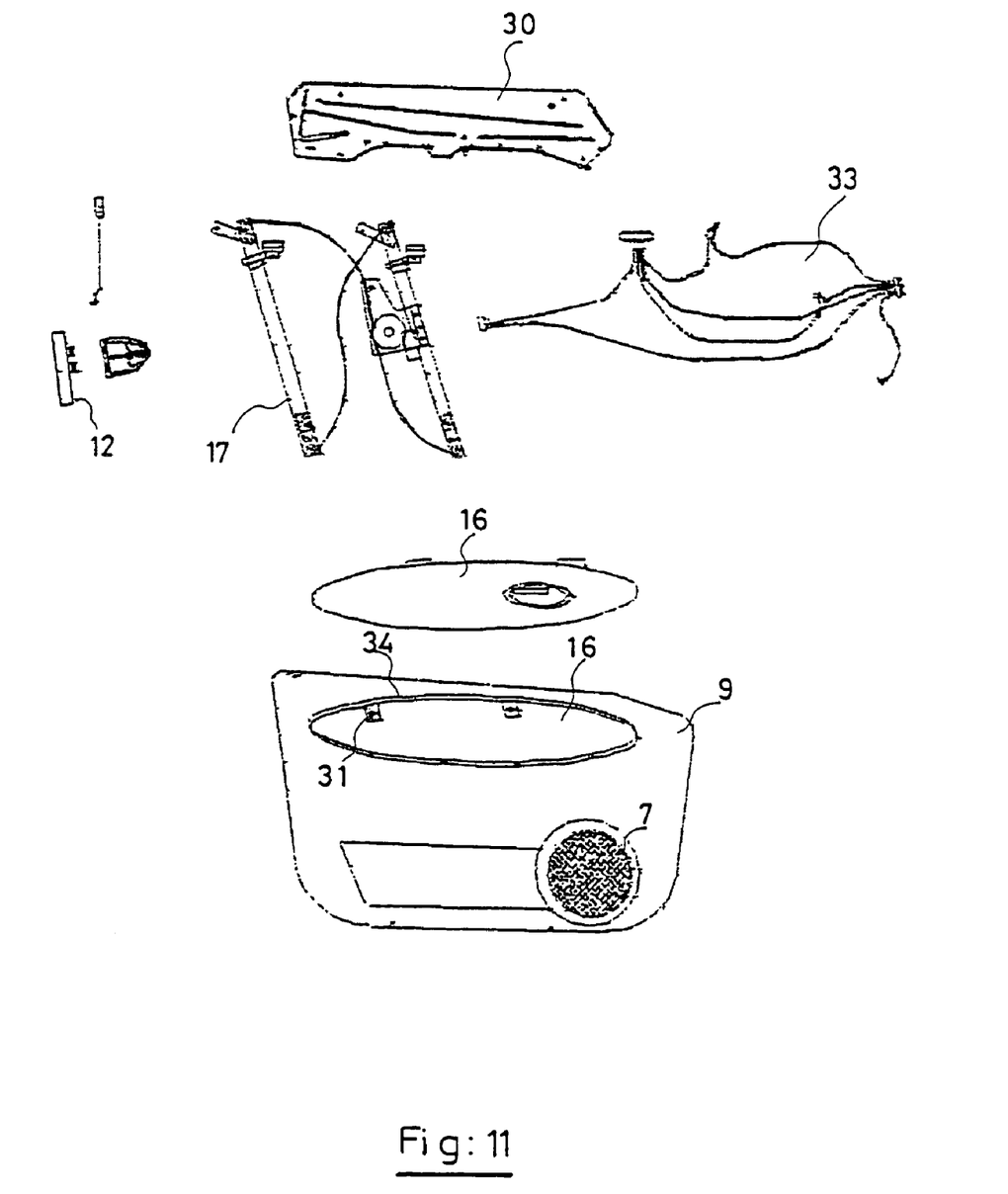
FIG. 11 makes it possible to observe the main components separated from the door module.

FIG. 11 shows us the majority of the main components of the modular unit, with the trim (9) and with its opening (16) for the fitting of the boss, and in which the lugs (31) can be seen at the edge (34) of the said opening. This trim also includes a loudspeaker (7) and the side pocket or compartment.

Also illustrated is the window winder unit, the ribbed base plate (30), as well as the wiring layout (33) required for the correct operation of the mechanisms and the lock unit (12).

With respect to FIG. 14, we can observe the visible side of the trim (9) with the gap or opening (16) for the boss, in which the interior door opening control has been drawn. This control, among others, can form part of the door module, as already stated earlier.

FIG. 15 shows a formal solution for the ribbed base plate (30), on which the lock (12) is situated, drawn back inside the perimetric interior of the part in order to facilitate the assembly of the module.

As mentioned previously, the opening for the boss will facilitate the access needed for the assembly of the different items, fixing operations, etc., so that when all the components have been placed and are in an operative position, the boss is placed, closing the opening.

As can be deduced from FIGS. 9 to 12, it must be pointed out that the connection between the rails (17) of the window winder and the trim (9) is such that the latter is also secured by the same bolts or screws as used for the rails.

The window winder which is fitted can also be manually operated and the use of the double rail system is also admissible. In this case, and given that, as there are two drive slides there is sufficient connection with the window pane, the extensions of the window pane guides towards the interior of the door inner liner are not necessary, with which the assembly of the unit is made easier.

In the case of door inner liners of a certain considerable size, there are usually no problems of space for the perfect fitting of the unit when double rail window winders are used. However, in other cases of smaller door inner liners, problems might arise for the appropriate location of the window winder rails.

In order to completely avoid these disadvantages, it is proposed that open gaps be made in the lower horizontal surface of the door inner liner, so that the ends of the rails can clear this lower area without greater problems.

As can be deduced from FIG. 22, we can appreciate the variant for the ribbed reinforcing plate with an approximately "X" shape (52), which also includes the lock (12) and the rails (17) of the window winder, secured to the said plate by means of the connections (51).

The reinforcing part (52) remains secured to the door inner liner (26) by means of the bolted or screwed connection (53) that correspond with the four ends of the "X" shape. The two upper ones are supported, as can be seen, on the upper part of the door (26) and the two lower ones on the lower part.

In FIG. 23, we illustrate the variant of FIG. 22, according to which the X-shaped ribbed plate is formed and is provided with longitudinal edges (55) along which the drive slides of the window winder system would travel, and in which the wiring, pulleys of this system are also shown. The points (53) will in this case be the points at which the plate is fixed to the door.

In accordance with FIG. 16, we can see the door panel (9) and the door inner liner (26) arranged close to each other. Standing out from the door panel are the deflector (37) and the appendages (40) below it. The lower side of the deflector holds the foam (38) that rests on the projection on the edge of the door inner liner (26) while the appendages receive the profile (39). The ends (41, 42) of this profile rest on the surface of the door inner liner, just below the two drain holes (43, 44) cut in the door inner liner itself.

In the plan view shown in FIG. 20, we can observe the route or path of the deflector (37) with the support area for the foam gasket in the lower area of the door (26) and the arrangement of the two rows of drain holes, upper (43) and lower (44), in relation to which the path of the profile (39) also runs, as well as the arrangement of the door inner liner (26).

With reference to FIG. 21, we can appreciate the variant of the invention, according to which the profile arranged between the appendages (40) of the door panel (9) is replaced by a bead or line of adhesive (49) between the ends of the appendages and the door inner liner (26)

In accordance with FIG. 17, we highlight the detail of the bolted or screwed area between the door panel and the door inner liner, in which a metal bush or socket (46) is placed, inside which the bolt or screw (47) can be secured with a tightening torque without deforming the parts.

With reference to FIGS. 18 and 19, we point out the detail of the water drain that could possibly be made on the deflector (37), by making the said deflector with an outward and downward inclined channel (50), which is directed towards the door inner liner (26). This channel will occupy such a position that the paths of the adjacent sections of the deflector are inclined upward so that the water is directed towards the said channel by gravity.

The channel (50) directs the water towards the door inner liner (26), which is the damp area of the assembly, for example through a hole in the body of the said door inner liner that leads the water towards its base, where it is drained to the exterior through the conventional holes that these kind of items are provided with.

The invention claimed is:

1. A door module adapted to be fixed to a conventional panel or face of a door of an automotive vehicle having an interior, said door module comprising:
   a door trim panel;
   at least one of a window regulator subassembly and a door lock subassembly carried by said door trim panel prior to assembly of said door module to the inner panel or face;
   a lower deflector arranged to be located at an upper edge of a lower portion of the inner panel or face;
   a piece of elastic foam material below said deflector;
   two support appendages that are directed towards the inner panel or face when said door module is assembled to the inner panel or face; and
   a profile disposed between said appendages, said profile having two ends that project towards the inner panel or face at different heights, when said door module is assembled to the inner panel or face, to form two lines of waterproofing associated with drain holes in the inner panel or face, wherein said deflector, said piece of elastic foam material, said two support appendages and said profile form continuous lines between said door trim panel and the inner panel or face when said door module is assembled to the inner panel or face.

2. The door module of claim 1 wherein said piece of elastic foam material acts as a lower support for said door module when said door module is assembled to the inner panel or face.

3. The door module of claim 1, wherein said lower deflector has two inclined slopes relative to the horizontal, said two inclined slopes meeting at a lower common meeting point in a protruding channel (50) that extends downwards and towards the inner panel or face when said door module is assembled to the inner panel or face.

4. A door module adapted to be fixed to a conventional inner panel or face of a door of an automotive vehicle having an interior, said door module comprising:
   a door trim panel;
   at least one of a window regulator subassembly and a door lock subassembly carried by said door trim panel prior to assembly of said door module to the inner panel or face;
   a lower deflector arranged to be located at an upper edge of a lower portion of the inner panel or face;
   a piece of elastic foam material below said deflector;
   two support appendages that are directed towards the inner panel or face when said door module is assembled to the inner panel or face; and
   a longitudinal bead or strip of adhesive disposed between said appendages and the inner panel or face when said door module is assembled to the inner panel or face, wherein said deflector, said piece of elastic foam material, said two support appendages and said longitudinal bead or strip of adhesive form continuous lines between said door trim panel and the inner panel or face when said door module is assembled to the inner panel or face.

5. A door module adapted to be fixed to a conventional inner panel or face of a door of an automotive vehicle having an interior, said door module comprising:
   a door trim panel; and
   a window regulator subassembly carried by said door trim panel prior to assembly of said door module to the inner panel or face, wherein
   said window regulator subassembly comprises window winder rails having L-shaped appendages having fins; and
   said door module further comprises pairs of protruding lugs having holes, said lugs being secured to said door trim panel and said fine being held loosely in said holes of said lugs in order to maintain said rails attached to said door trim panel during transport of said door module and until said door module is assembled to the inner panel or face.

6. The door module of claim 5 wherein said door trim panel is securable to the inner panel or face by bolts or screws that also fasten said rails to said door trim panel.

* * * * *